US005623239A

United States Patent [19]

Sitar

[11] Patent Number: 5,623,239

[45] Date of Patent: Apr. 22, 1997

[54] ELECTRICAL CONTACTOR SPRING

[75] Inventor: Clem P. Sitar, Addison, Ill.

[73] Assignee: Furnas Electric Co., Batavia, Ill.

[21] Appl. No.: 587,639

[22] Filed: Jan. 17, 1996

[51] Int. Cl.[6] .................... H01M 67/02

[52] U.S. Cl. .................... 335/132; 335/202

[58] Field of Search .................... 335/132, 202

[56] References Cited

U.S. PATENT DOCUMENTS

| | | | |
|---|---|---|---|
| 2,544,491 | 3/1951 | Davis . | |
| 2,852,637 | 9/1958 | Pratt . | |
| 3,251,964 | 5/1966 | Lawrence et al. . | |
| 3,396,354 | 8/1968 | Fisher . | |
| 3,553,613 | 1/1971 | Turnbull et al. | 335/202 |
| 3,643,190 | 2/1972 | Puetz et al. | 335/132 |
| 4,081,775 | 3/1978 | Rockl et al. . | |
| 4,112,402 | 9/1978 | Schantz . | |
| 4,724,410 | 2/1988 | Degenhart | 335/132 |
| 5,281,937 | 1/1994 | Young . | |

*Primary Examiner*—Lincoln Donovan
*Attorney, Agent, or Firm*—Wood, Phillips, VanSanten, Clark & Mortimer

[57] ABSTRACT

The manufacture of an electrical contactor is simplified by a construction including a base 22, a contactor assembly 20 having electrical contacts 32, a magnetic core 26, an armature assembly having an armature 30 movable in proximity to the core 26 and capable of moving the contacts 32 between circuit making and circuit breaking positions, and a spring 36, the spring 36 being integrally formed in the base 22 and resiliently supporting the magnetic core 26. The spring 36 controls the bounce in the contacts 32 when the contactor is energized by dissipating the kinetic energy imparted to the armature 30, the core 26, or both.

12 Claims, 2 Drawing Sheets

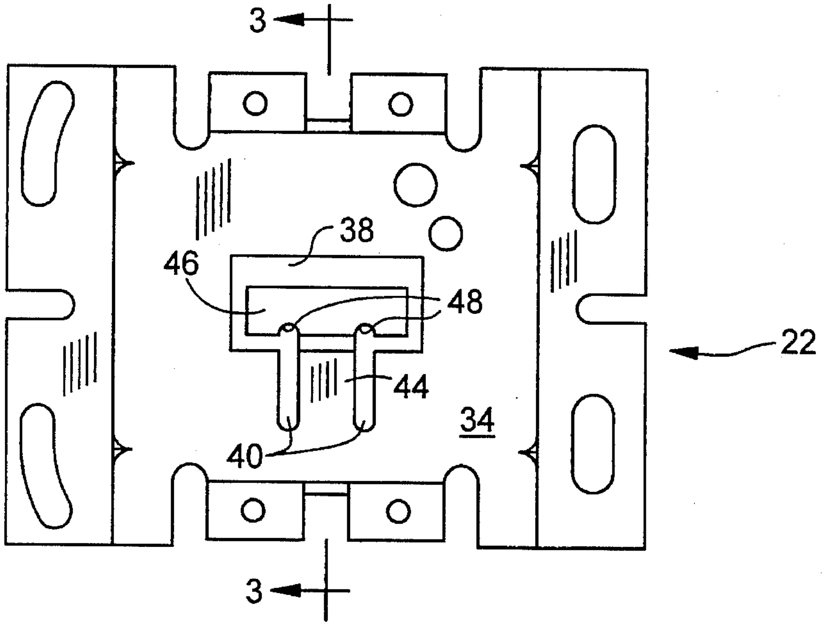
FIG. 2
FIG. 3
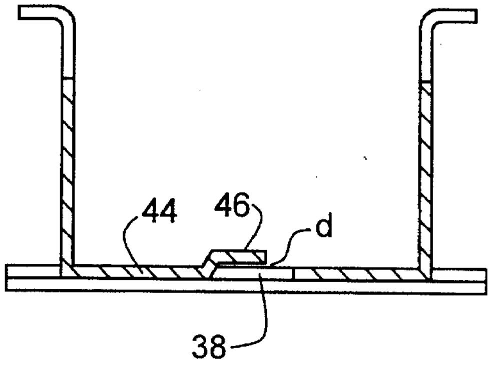
FIG. 4
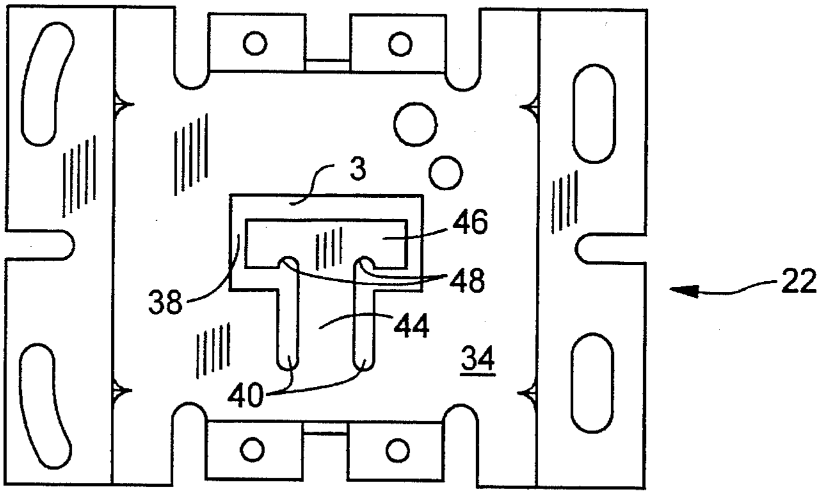

ELECTRICAL CONTACTOR SPRING

FIELD OF THE INVENTION

This invention relates to an electrical contactor. More particularly, this invention relates to an improved contactor base having a spring integrally formed therein for controlling contact bounce or chatter through the dissipation of kinetic energy.

BACKGROUND OF THE INVENTION

When a conventional electrical contactor or relay is energized, a movable metallic armature is drawn towards a magnetic core such that electrical contacts mechanically linked to the armature are bought into or moved out of contact with electrical contacts disposed on the housing of the contactor, thus closing or opening an electrical circuit. Because the movable armature will have some momentum remaining after the contacts make or break, and to assure good separation or firm engagement of the contacts, the movable armature is allowed to continue to move towards the magnetic core. This movement of the armature will substantially cease when the armature collides with a stationary portion of the contactor, such as the magnetic core.

After contacting the magnetic core, the armature will move away or rebound from the magnetic core. The armature will continue to rebound until such time as the forces acting on the armature cause it to reverse direction for a second time, whereupon the cycle starts anew. This cycle of attraction, collision, and rebound will continue until the kinetic energy of the armature and/or core is finally dissipated, for example, through friction or in the form of thermal energy.

This cyclic process, also known as chatter or bounce, can have a deleterious effect on the life of the mechanical components of the electrical contactor. Specifically, chatter or bounce can seriously decrease the life of the surfaces at the point of contact, i.e. the lower surface of the armature and the upper surface of the magnetic core.

Additionally, bounce can cause special problems for the electrical components of the contactor. As the armature cyclicly moves towards and away from the magnetic core, the associated electrical circuit may alternatively and repeatedly open and close. At the very least, the periodic opening and closing of the electric circuit will cause unwanted noise within the circuit. Electric arcing occurring between the contacts on the armature and on the housing can also cause the contacts to erode and possibly result in the contacts becoming welded together.

It has been found that bounce in an electric contactor can be controlled by introducing a spring between the magnetic core and the base of the contactor. The spring eliminates the bounce of the armature and associated contacts by dissipating the kinetic energy in the core and the armature. Conventionally, the spring is manufactured separately from the base, as shown in FIG. 2 of U.S. Pat. No. 4,945,328, and is attached to the base during assembly of the contactor.

However, the art of electrical contactor fabrication is well developed and highly competitive. Generally, competitive offerings are comparable in terms of reliability and life with the result that the principal competitive advantage is price. Consequently, it is highly desirable to provide a contactor that is economically manufactured so as to be price competitive while retaining or improving upon the reliability of prior construction.

The present invention is directed to attaining the-above-mentioned result.

SUMMARY OF THE INVENTION

It is an object of the present invention to control bounce in an electrical contactor.

It is a further object of the present invention to control bounce in an electrical contactor while reducing the overall cost of the contactor fabrication.

It is another object of the present invention to control bounce in an electrical contactor while reducing the number of parts used in the contactor and the number of steps required to assemble the contactor.

According to one facet of the invention, an electrical contactor includes a base and a contactor assembly, the contactor assembly having electrical contacts movable between circuit making and circuit breaking positions. A magnetic core and an armature assembly are mounted on the base, the armature assembly having an armature movable in proximity to said core and operable to cause the contacts to move between the circuit making and circuit breaking positions. Also provided is a spring interposed between the core and the base to control bounce of the contacts by dissipating the kinetic energy of the armature and/or core. Particularly, the base is made of a resilient material and the spring includes a integral projection formed from the base and extending from the base into engagement with the core.

According to another facet of the invention, an electrical contactor includes a contactor assembly having electrical contacts movable between circuit making and circuit breaking positions and a base having a cut-out defining a spring. A magnetic core is mounted on the base in abutment with the spring. An armature assembly is also mounted on the base and has an armature movable in proximity to the core and operable to cause the contacts to move between the positions. The spring resiliently supports the magnetic core to control the bounce of the contacts by dissipating the kinetic energy imparted to the armature and/or the core.

According to a further facet of the invention, an electrical contactor includes a base and a contactor assembly with electrical contacts movable between circuit making and circuit breaking positions. A magnetic core is mounted on the base, as is an armature assembly. The armature assembly has an armature movable in proximity to the core and operable to cause the contacts to move between the circuit making and circuit breaking positions. In this facet of the invention, the base also includes integrally formed biasing means interposed between the base and the magnetic core for controlling bounce in the contacts by dissipating the kinetic energy imparted to the armature and/or core.

Other objects and advantages of will become apparent from the following specification taken in connection with the accompanying drawings.

DESCRIPTION OF THE DRAWINGS

FIG. 2 is a plan view of a preferred embodiment of a base utilized in the contactor;

FIG. 3 is a vertical section taken along the line 3—3 in FIG. 2;

FIG. 4 is a plan view of the base at an intermediate stage in its fabrication.

DESCRIPTION OF THE PREFERRED EMBODIMENT

Figure 1:
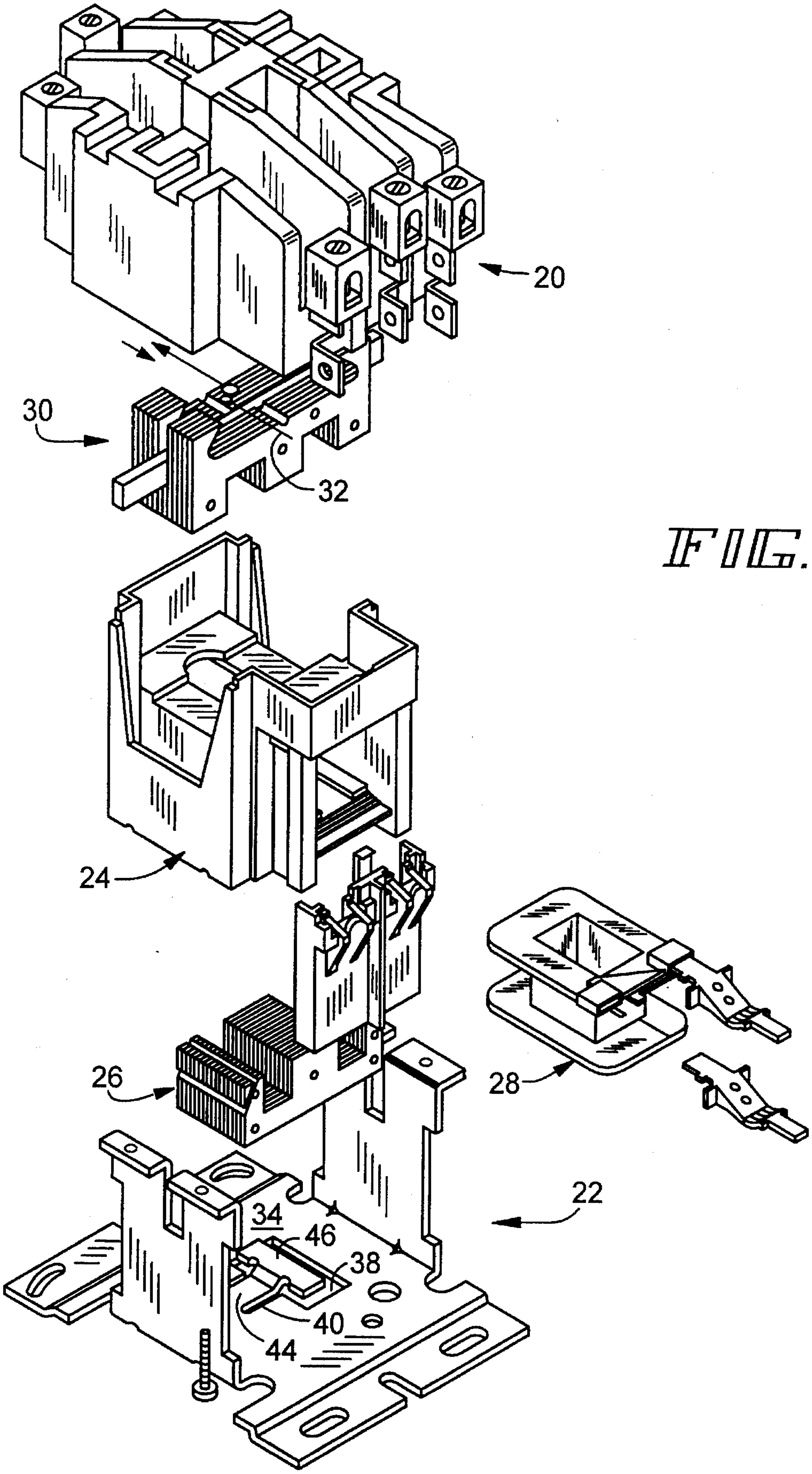
FIG. 1 is a exploded, perspective view of a contactor made according to the invention.

An exemplary embodiment of an electrical contactor made according to the invention is illustrated in the drawings and with reference to FIG. 1 is seen to be composed of six principal components. The first component is an upper contactor assembly, generally designated 20. The second component is a generally U-shaped base, generally designated 22. A shell, generally designated 24, is located between the base 22 and the contactor assembly 20 and with the former serves to locate a magnetic core, generally designated 26, within the assembly 20. The core 26 is made of laminated magnetic steel as is well known. A bobbin, winding and terminal assembly, generally designated 28, is located within the shell 24 and on the core 26. The general assembly is completed by a laminated metallic steel armature, generally designated 30, which is conventionally associated with movable contacts such as shown schematically at 32 in FIG. 1 and contained within the contactor assembly 20. For a more detailed description of these components, reference is made to U.S. Pat. No. 4,945,328, the detail of which is incorporated herein by reference.

When the contactor is energized, the movable armature 30 is drawn toward the magnetic core 26. The movement of the armature 30 toward magnetic core 26 causes contacts 32 on the armature 30 to contact a second set of contacts (not shown) disposed within the upper contactor assembly 20, thus closing an electric circuit. Alternatively, the arrangement could be such as to open contacts, or even open one set of contacts while closing another, upon movement of the armature 30 toward the core 26. Even after the contacts 32 and the contacts on the contactor assembly 20 make and/or break, the momentum of the armature 30 will cause the armature 30 to continue to move in the direction of the core 26. Subsequently, the armature 30 will collide with the magnetic core 26 and rebound in the direction opposite to its previous direction of movement. Eventually, the magnetic force from the core 26 acting on the armature 30 will cause armature 30 to change direction for a second time, and once again move in the direction of the magnetic core 26. The armature 30 will continue to bounce until the kinetic energy of the armature 30, some of which may be imparted to the core 26, is finally dissipated.

To increase the rate of dissipation of the kinetic energy of the armature 30 and the core 26, thereby decreasing or eliminating the bounce of the armature 30 and the associated contacts 32, the base 22, preferably made of a resilient material, has a bight 34 in which is formed a spring 36 defined by a cut-out 38, as illustrated in FIGS. 1 and 2. The cut-out 38 includes a C-shaped slot 40 with two elongated slots 42. The elongated slots 42 are formed at either end of the C-shaped slot 40.

The spring 36 is T-shaped and has a main member 44 and a cross-member 46. The cross-member 46 is displaced from the plane of the base 22 a distance d, as shown in FIG. 3. The spring 36 and the cut-out 38 are manufactured in the following manner.

The cut-out 38 can be formed by any of a number of conventional processes, such as punching or stamping. The cut-out 38 will initially have a substantially uniform slot width, generally indicated as w in FIG. 4. Rounded reliefs 48 are formed at the intersection of the main member 44 with the cross-member 46 for relieving stresses. Once the cut-out 38 has been formed, the base 22 is then taken to a finishing machine where the tabular spring 36 will be displaced from the plane of the bight 34 to be above the same as seen in FIG. 3, and the core 26 assembled against the same.

In operation, when the armature 30 slams against the core 26, the latter gives against the bias of the spring 36. Thus, the collision between the armature 30 and the core 26 is highly inelastic. This, in turn, means that much of the energy that would normally cause the armature 30 to rebound away from the core 26 to cause undesirable bounce is unavailable and bounce will occur only at a low magnitude that is tolerable.

Thus, the invention achieves control of undesirable bounce at low cost. By forming the spring 36 integrally with the base 22, the need for a separate spring and the concomitant need to assemble the spring into the contactor are both eliminated. A lower cost, more reliable, easier to assemble contactor results.

I claim:

1. In a contactor, the combination of:

a base;

a contactor assembly, including electrical contacts movable between circuit making and circuit breaking positions;

a magnetic core mounted on said base;

an armature assembly mounted on said base and having an armature movable in proximity to said core and operable to cause said contacts to move between said positions;

a spring interposed between said core and said base to control bounce of said contacts by dissipating kinetic energy imparted to said armature, said core or both;

said base being made of a resilient material and said spring including an integral projection formed from said base and extending therefrom into engagement with said core.

2. The contactor of claim 1 wherein said base is generally U-shaped and has a bight with legs extending therefrom, and said spring projects from said bight.

3. The contactor of claim 2 wherein a C-shaped cut-out is formed in said bight and defines said projection.

4. The contactor of claim 3 wherein said bight is generally planar and said projection is displaced toward said core from the plane of said bight.

5. The contactor of claim 3 wherein said projection is generally T-shaped.

6. In a contactor, the combination of:

a base having a cut-out defining a spring;

a contactor assembly, including electrical contacts movable between circuit making and circuit breaking positions;

a magnetic core mounted on said base in abutment with said spring; and an armature assembly mounted on said base and having an armature movable in proximity to said core and operable to cause said contacts to move between said positions;

said spring resiliently supporting said magnetic core to control bounce of said contacts by dissipating kinetic energy imparted to said armature, said core or both.

7. The contactor of claim 6 wherein said base has generally planar section and said cut-out is formed in said generally planar section.

8. The contactor of claim 6 wherein the cut-out is generally C-shaped.

9. The contactor of claim 6 wherein said spring is generally T-shaped.

10. The contactor of claim 9 wherein said base is generally planar and said spring has a main member in the plane of said base and a cross-member displaced toward said core from the plane of said base.

11. In a contactor, the combination of:

a base;

a contactor assembly, including electrical contacts movable between circuit making and circuit breaking positions;

a magnetic core mounted on said base; and an armature assembly mounted on said base and having an armature movable in proximity to said core and operable to cause said contacts to move between said positions;

said base including integrally formed biasing means interposed between said base and said magnetic core for controlling bounce in said contacts by dissipating the kinetic energy imparted to said armature, said core, or both.

12. The contactor of claim 11, wherein said biasing means includes a projection formed from said base and extending into engagement with said core.

* * * * *